United States Patent
Choi

(10) Patent No.: US 7,480,302 B2
(45) Date of Patent: Jan. 20, 2009

(54) PACKET CLASSIFICATION METHOD THROUGH HIERARCHICAL RULEBASE PARTITIONING

(75) Inventor: Lynn Choi, Seoul (KR)

(73) Assignees: Samsung Electronics Co., Ltd., Suwon-Si (KR); Korea University Industry and Academy Corporation Foundation, Seoul (KR)

( * ) Notice: Subject to any disclaimer, the term of this patent is extended or adjusted under 35 U.S.C. 154(b) by 635 days.

(21) Appl. No.: 11/118,326

(22) Filed: May 2, 2005

(65) Prior Publication Data

US 2005/0254502 A1 Nov. 17, 2005

(30) Foreign Application Priority Data

May 11, 2004 (KR) .............. 10-2004-0032944
Jul. 28, 2004 (KR) .............. 10-2004-0059058

(51) Int. Cl.
*H04L 12/28* (2006.01)
*H04L 12/56* (2006.01)

(52) U.S. Cl. ............... 370/395.32; 370/392; 370/394; 711/216; 706/45; 706/46; 706/47

(58) Field of Classification Search ............ 370/389, 370/392, 394, 395.32; 706/45, 46, 47
See application file for complete search history.

(56) References Cited

U.S. PATENT DOCUMENTS

| 7,191,163 B2* | 3/2007 | Herrera et al. ............ 706/47 |
| 7,248,585 B2* | 7/2007 | Kohn et al. ............ 370/392 |
| 2002/0152209 A1* | 10/2002 | Merugu et al. ............ 707/7 |
| 2003/0131078 A1* | 7/2003 | Scheer et al. ............ 709/220 |

FOREIGN PATENT DOCUMENTS

WO  WO 03/036902  5/2003

\* cited by examiner

*Primary Examiner*—Chirag G Shah
*Assistant Examiner*—Minh-Trang Nguyen
(74) *Attorney, Agent, or Firm*—Staas & Halsey LLP

(57) ABSTRACT

A packet classification method through hierarchical rulebase partitioning. The packet classification method for searching for a rule having a highest priority and matching among a plurality of rules included in a specified rulebase with respect to a packet input from an external network and processing the packet according to the searched rule. The method includes: a preprocessing step of partitioning the rulebase into a plurality of independent sub-rulebases based on a specified condition and producing a hash table on the basis of the sub-rulebases; and a classification step of classifying the packet by searching the hash table using a hash key extracted from a packet header of the inputted packet and mapping the packet on the sub-rulebase corresponding to the packet.

13 Claims, 4 Drawing Sheets

| CLASSIFICATION SPACE ($b_0 b_1 b_2 b_3 \ldots b_{103}$) | RULE |
|---|---|
| 0000 0110... | R0 |
| 0000 0110... | R1 |
| 0001 0001... | R2 |
| 0000 0001... | R3 |
| **** ****... | D |

(b)

| HASH KEY 8MSBs ($b_0 b_1 b_2 b_3 b_4 b_5 b_6 b_7$) | SUB-RULEBASE |
|---|---|
| 0000 0000 | NULL ENTRY |
| 0000 0001 | R3 |
| ... | NULL ENTRY |
| 0000 0110 | R0, R1 |
| ... | NULL ENTRY |
| 0001 0001 | R2 |
| ... | NULL ENTRY |
| 1111 1111 | NULL ENTRY |

(c)

| HASH KEY 8MSBs $b_3 b_5$ | SUB-RULEBASE |
|---|---|
| 00 | R3 |
| 01 | R0, R1 |
| 10 | R2 |
| 11 | NULL ENTRY |

PACKET CLASSIFICATION METHOD THROUGH HIERARCHICAL RULEBASE PARTITIONING

CROSS-REFERENCE TO RELATED APPLICATIONS

This application claims benefit under 35 U.S.C. § 119 from Korean Patent Application No. 2004-32944, filed on May 11, 2004, and No. 2004-59058, filed on Jul. 28, 2004, the disclosures of which are incorporated herein by reference.

BACKGROUND OF THE INVENTION

1. Field of the Invention

The present invention relates to a packet classification method, and more particularly to a packet classification method through hierarchical rulebase partitioning, which can reduce a search time required for packet classification by partitioning a rulebase into independent sub-rulebases through a plurality of hashing stages and classifying input packets only in a related sub-rulebase.

2. Description of Related Art

Packet classification is one of the most fundamental building blocks in many networking functions such as Diff-Serv traffic conditioning, firewall, VPN, traffic accounting and billing, load-balancing, and policy-based routing. These functions need to track flows and give the same treatment to the packets in a flow. A rulebase stores classification rules, which define the flows and their corresponding treatments. Since a flow is defined by the header values of a packet, a classfier's duty is to examine the header and identify the corresponding flow.

Internet traffic is not only fast growing, but it is also diversifying both in applications and in protocols. New applications and protocols such as Internet telephony, security protocols, and peer-to-peer applications are being rapidly deployed in addition to the traditional Internet applications such as Web, ftp, and email. As a result, the rulebase size is rapidly increasing. In a recent study [T. Woo, "*A Modular Approach to Packet Classification: Algorithms and Results*", In Proceedings of the IEEE INFOCOM '00. March 2000.], Woo argues that a rulebase with over a million entries is possible in future packet classification applications. From the classifier's viewpoint, this implies that for each packet the classifier must be able to find the matching rule with the highest priority amongst all the rules in the rulebase at the wire speed. Thus, there has been a renewal of interest in the scalability issue in the terms of the size of a rulebase. [(1) P. Gupta and N. McKeown, "*Packet Classification on Multiple Fields*", In Proceedings of the ACM SIGCOM '99, Vol. 29, issue 4, August 1999. (2) F. Baboescu and G. Varghese, "Scalable Packet Classification", In Proceedings of the ACM SIGCOM '01, Vol. 31, August 2001. (3) *Flow Analysis of Passive Measurement Data*, http://pma.nlanr.net/PMA/Datacube-.html. (4) T. V. Lakshman and D. Stiladis, "*High-speed Policy-based Packet Forwarding using Efficient Multi-dimensional Range Matching*", In Proceedings of the ACM SIGCOMM '98 Vol. 28, pp. 191-202, 1998. (5) V. Srinivasan, S. Suri, G. Varghese, and M. Valdvogel, "*Fast and Scalable Layer Four Switching*", In Proceedings of the ACM SIGCOMM '98, Vol. 28, pp. 203-214, 1998. (6) V. Srinivasan, G. Varghese, and S. Suri, "*Packet Classification Using Tuple Space Search*", In Proceedings of the ACM SIGCOMM '99, Vol. 29, pp. 135-146, August 1999. (7) M. M. Buddhikot, S. Suri, and M. Waldvogel, "*Space Decomposition Techniques for Fast Layer-4 Switching*", In Proceedings of the IFIP Sixth International Workshop on Protocols for High Speed Networks. Vol. 66, No. 6, pp. 277-283, August 1999. (8) A. Feldmann and S. Muthukrishnan, "*Tradeoffs for packet Classification*", In Gigabit Networking Workshop of the Proceedings of the IEEE INFOCOM '00. March 2000. (9) P. Gupta and N. Mckeown, "*Packet Classification using Hierarchial Intelligent Cuttings*", In Proceedings of the Hot Interconnects VII, 1999.]

Most of existing works, however, mainly focus on relatively small classifiers, for example, with less than 20 K rules. To address this issue, we propose a new scalable packet classification algorithm that can scale well up to this size.

Also, the conventional packet classification has problem as follows. Given a rulebase, $$R = \sum_{i=1}^{n} r_i,$$

which is a set of rules, a packet classifier needs to identify the rule that incoming packet matches to by looking up one or more fields of the packet header. Each rule is specified by the range of values in one or more fields of a packet header. Specifically, in d-dimensional packet classification, each rule $r_i$ is defined over d fields. Formally, $r_i$ is defined by a tuple ($C_i$, $A_i$) where $C_i$ is called a classification space and, $A_i$ is the associated action of rule $r_i$. The classification space is defined by the crossproduct, $$C_i = F_1 \otimes F_2 \otimes \ldots F_d = \prod_{k=1}^{d} F_k^i,$$

is a range of values the field k must take. A rule $r_i$ match a packet $p = \{b_1, b_2, \ldots, b_d\}$ if for $$\forall k, b_k \in F_k^i$$

where $b_k$ is a singleton. Multiple rules can match a packet. Thus, a classifier must identify the highest priority rule among all the matching rules. Intuitively, this requires the classifier to lookup the header fields of an incoming packet and to compare them against the rules in the rulebase one by one in order of decreasing priority. When n, for example the number of rules, is large of arrival rate λ of incoming packet is high, this is a time-consuming serial process, which will limit the speed of the classifier. Thus, the essence of the problem is to find a fast yet scalable classification function both in time and in space.

BREIF SUMMARY

The present invention has been developed in order to solve the above drawbacks and other problems associated with the conventional arrangement. An aspect of the present invention is to provide a packet classification method through hierarchical rulebase partitioning which can improve the search efficiency by hierarchically partitioning a rulebase into independent sub-rulebases of a small size using an efficient hash key selection algorithm.

For this, the present invention proposes diverse hash key algorithms and maximum entropy hashing for selecting a hash key that maximizes the hash key algorithm as the most efficient algorithm.

Another aspect of the present invention is to provide a packet classification method which can be applied to a packet classifier having a large-sized rulebase that is difficult to be processed through the existing packet classification method, to keep pace with the tendency to increase the size of the rulebase.

According to an aspect of the present invention, there is provided a packet classification method for searching for a rule having a highest priority and matching among a plurality of rules included in a specified rulebase with respect to a packet input from an external network and processing the packet according to the searched rule. The method includes: preprocessing by partitioning the rulebase into a plurality of independent sub-rulebases based on a specified condition and producing a hash table on the basis of the sub-rulebases; and classifying the packet by searching the hash table using a hash key extracted from a packet header of the inputted packet and mapping the packet on the sub-rulebase corresponding to the packet.

The preprocessing may include a first partitioning of the rulebase into the plurality of sub-rulebases based on a specified protocol and a specified port number and producing the hash table on the basis of the sub-rulebases.

A specified application may be determined according to the protocol and the port number.

The preprocessing may also include a second partitioning of re-partitioning a specified sub-rulebase among the plurality of sub-rulebases using the hash key extracted by a specified method from departure and destination IP addresses, and producing the hash table on the basis of the sub-rulebases if the number of rules in the specified sub-rulebase exceeds a specified threshold value.

The specified method may be one among an MSB pattern, an exponential growing pattern, a mask distribution pattern and an entropy-maximizing pattern.

The MSB pattern method may select a specified number of bits from most significant bits of the destination IP address and the departure IP address.

The exponential growing pattern method may select a bit position corresponding to an exponential function of 2 from the destination IP address and the departure IP address.

The mask distribution pattern method may calculate accumulated values at respective bit positions bi by adding the number of bits which are not a dummy bit in all defined rules belonging to the rulebase, calculate the total accumulated value by adding the accumulated values from the most significant bit to the least significant bit, and then select the specified bit position whenever the accumulated value at the specified bit position becomes a multiple of a value obtained by dividing the total accumulated value by K.

The K may be a bit value of the hash key to be produced.

The entropy-maximizing pattern method may select a specified number of bits that maximize entropy from the destination IP address and the departure IP address.

According to another aspect of the present invention, there is provided a method of reducing a search time for packet classification of an input packet, including: hierarchally partitioning a rulebase into sub-rulebases by hashing bit fields selected from a classification field; extracting a hash key from a header of the input packet; and searching a hash table using the hash key to match the input packet to a corresponding sub-rulebase.

According to another aspect of the present invention, there is provided a packet classification method of searching for a rule having a highest priority in a rulebase with respect to an input packet and, including: partitioning the rulebase into a plurality of sub-rulebases based on a specified condition and producing a hash table on the basis of the sub-rulebases; extracting a hash key from a packet header of packet; and classifying the packet by searching the hash table using the hash key; and mapping the packet on the sub-rulebase corresponding to the packet.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which:

FIG. 5 parts (a)-(c) are views illustrating a rulebase and hash table prepared using a hash key algorithm that extracts respective 8 MSBs from the departure and destination IP addresses.

DETAILED DESCRIPTION OF EMBODIMENT

Figure 1:
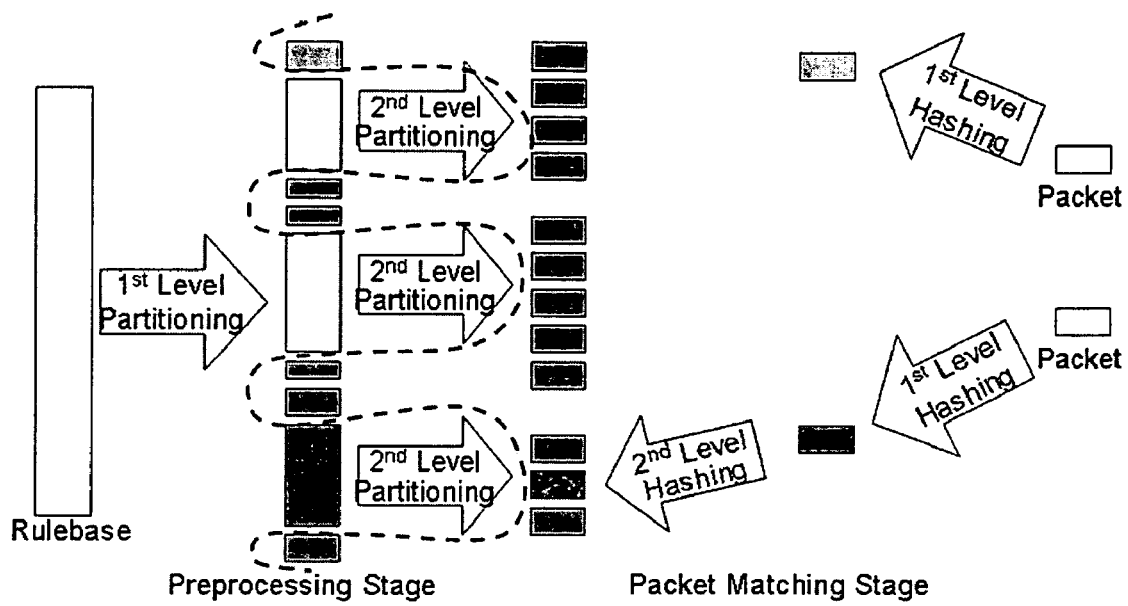
FIG. 1 is a view explaining the concept of a packet classification method through hierarchical rulebase partitioning according to an embodiment of the present invention.

Reference will now be made in detail to an embodiment of the present invention, examples of which are illustrated in the accompanying drawings, wherein like reference numerals refer to the like elements throughout. The embodiment is described below in order to explain the present invention by referring to the figures.

In the following description, the same drawing reference numerals are used for the same elements even in different drawings. The matters set forth in the description such as detailed constructions and elements are examples provided to assist in a comprehensive understanding of the present invention. Thus, it is apparent that embodiments of the present invention can be carried out without those defined matters. Also, well-known functions or constructions are not described in detail.

1. Proposed Algorithm

A packet classification method according to an embodiment of the present invention is based on the assumption that in a rulebase, only some of the rules will match a given packet. The packet classification method according to an embodiment of the present invention will now be explained with reference to Table 1, which shows a rulebase of a typical firewall. [Elizabeth D. Zwicky et al. "Building Internet Firewall", $2^{nd}$ edition. O'Reilly, 2000].

TABLE 1

| Rule | Protocol | Departure Port | Destination Port | Departure IP | Destination IP | Action | Purpose of Rule |
|---|---|---|---|---|---|---|---|
| R0 | * | * | * | Inside | Inside | Deny | Protection against Spoofing Attacks |
| R1 | TCP | 1024~65535 | 80 | Outside | Inside | Accept | HTTP Service |
| R2 | TCP | 1024~65535 | 23 | Outside | Inside | Accept | Telnet Service |
| R3 | TCP | 1024~65535 | 21 | Outside | Inside | Accept | FTP Service |
| D | * | * | * | * | * | Deny | Default Rule |

In Table 1, the term 'inside' means a local network protected by a firewall, and 'outside' means a network separated from the inside network by the firewall.

The inside network performs various application services such as a hypertext transport protocol (HTTP), a terminal emulation (Telnet) and a file transfer protocol (FTP). First to third rules R1, R2 and R3 receive access requests for diverse application services, and the zeroth rule R0 protects the inside network from a spoofing attack. The spoofing attack is a technique of attacking other target systems by deceiving its own ID information. Meanwhile, D denotes a default rule for excluding all communications with the outside. In Table 1, the packet using a user datagram protocol (UDP) protocol can match only R0 or D. Thus, it is not required for R1 to R3 to match the packet.

FIG. 1 is a view explaining the concept of a packet classification method through hierarchical rulebase partitioning according to an embodiment of the present invention. Referring to FIG. 1, the packet classification method through hierarchical rulebase partitioning according to an embodiment of the present invention is performed through two stages of preprocessing and classification. The idea is to use divide-and-conquer approach.

At the preprocessing stage, the original rulebase is hierarchically partitioned into independent sub-rulebases of a small size based on the values of classification fields where each rule is defined. The degree of partitioning depends on the density of the sub-rulebase in a classification space. The higher the density of the sub-rulebase is in the classification space, the more the partitioning is required. If all the sub-rulebases become small enough, the partitioning is interrupted.

Next, at the classification stage, a packet classifier looks up the same header fields of an incoming packet and identifies the sub-rulebase (s) over the size of the original rulebase (n) is small, then scalability issue can be overcome by a single memory look up to the hash table, which is constructed during the preprocessing phase. If a sub-rulebase is still large, then the sub-rulebase can be re-partitioned until the final sub-rulebase is small enough.

According to [H. Kim, J. Heo, L. Choi, and S. Kim, "Taming Large Classifiers with Rule Reference Locality", In Proceedings of the ICOIN. Vol. 1 pp. 35-50, February 2003.], a rule $$r_1 = \left( \prod_{k=1}^{d} F_k^1, A_1 \right)$$

overlaps with a rule $$r_2 = \left( \prod_{k=1}^{d} F_k^2, A_2 \right) \text{ if } \forall k F_k^1 \cap F_k^2 \neq \Phi$$

Intuitively, two rules overlap if there exists any instance of a packet that matches both rules. Since sub-rulebases differ at least in those bits that are selected as the hash key, a packet cannot match both sub-rulebase at the same time. Thus, the independence among sub-rulebases is guaranteed. Therefore, we need to look up only the relevant sub-rulebase after inspecting a packet on the same bit fields.

Hereinafter, the preprocessing stage and the classification stage will be explained in order.

1.1 Preprocessing Stage: Rulebase Partitioning and Hash Table Construction

In preprocessing stage, we partition the original rulebase into many independent sub-rulebase. For example, the rules governing HTTP, FTP, and SMTP traffic can be partitioned into separate sub-rulebases. Then, by looking up the protocol field of an incoming packet, we only need to look up the sub-rulebase with the same protocol.

We can choose any of the bits in the classification fields as a hash key. If we select 8 bits, then we create a hash table with $2^8=256$ entries, each of which points to a sub-rulebase. Intuitively, two rules may overlap if they map to the same sub-rulebase while rules mapped to different sub-rulebases would never overlap, which implies that they are independent. Sub-rulebases larger than a threshold value, such as 16 rules, can be repartitioned with another hash key, which must be different from the first hash key. This hierarchial partitioning stops until all the sub-rulebases are small enough. However, our experimentation results show that two levels of partitioning are enough for a rulebase under 500 K rules.

Both the space and time complexity of our classification algorithm depend on the number of nodes and the depth of the partitioning hierarchy. To reduce the number of partitioning we need to partition a rulebase into sub-rulebase as evenly as possible so that the number of empty sub-rulebase is minimized and the number of rules in sub-rulebases must follow uniform distribution. This partitioning efficiency depends on the hash key selection algorithm.

1.2 Classification Stage

After the rulebase is partitioned and the hash table is produced at the preprocessing stage, the packet classifier maps an input packet on a corresponding sub-rulebase, so that the search range of the rulebase can be narrowed. The packet classifier searches the hash table using a hash key extracted from the packet header.

FIG. 5, parts (a)-(c) are views illustrating a rulebase and hash table made using a hash key algorithm that extracts respective 8 MSBs from the departure and destination IP addresses.

Referring to FIG. 5A, it is assumed that R0 to R3 are arranged in the order of their priorities. If the packet does not match the four rules R0 to R3, the packet matches a rule D having the lowest priority.

In this embodiment of the present invention, 5-dimensional packet classification is assumed. The packet classification is performed using 104 bits in total, i.e., 8 bits from a protocol field of the packet header, 16 bits from a source port, 16 bits from the destination port, 32 bit from the departure IP address, and 32 bits from the destination IP address. Generally, the protocol includes 8 bits, and has a specified number according to its kind.

Accordingly, the kind of the protocol is confirmed through the number of the protocol. Actually, the number of protocols appearing in the rule is less than 5 to 20. The ports are classified into the departure port and the destination port. The respective port is composed of 16 bits, and has one fixed number or area. Particularly, one of the departure and the destination on the basis of the firewall refers to the service port having a fixed number, and the other refers to the client having a temporary part in the area of 1024 to 65535.

Referring to FIG. 5B, only the most important 8 bits (hereinafter referred to as '8MSBs') are presented in the classification space, and indicate a specified header field such as the protocol field.

By partitioning the rulebase into 256 buckets using 8MSBs as shown in FIG. 5A, the hash table as shown in FIG. 5B is produced. In the hash table of FIG. 5B, the rules that belong to one sub-rulebase do not overlap the rules that belong to other sub-rulebases.

When the packet arrives, the packet classifier extracts 8MSBs from the packet header and uses the extracted 8MSBs as the index of the hash table. The hash key used for the packet classification is identical with the hash key used to partition the rulebase. If an entry of the hash table is not empty after the hashing is completed, the packet classification can be performed in the sub-rulebase that belongs to the entry. If the entry of the hash table is empty, the default rule D becomes the matching rule. FIG. 5C shows a hash table made using b3 and b5 as hash keys.

1.3 Hash Key Selection 1.3.1 The First-Level Partitioning

At the first level partitioning of the preprocessing stage, the rulebase is partitioned into a large number of independent sub-rulebases only based on the kind of protocol and a port number. For example, the rules that control HTTP, FTP and simple mail transfer protocol (SMTP) traffic can be partitioned into the independent sub-rulebases. Thereafter, by searching a header field of the inputted packet, only the sub-rulebases having the same protocol field as that of the inputted packet are searched.

At the preprocessing stage, a hash key of specified bits is selected in the classification space for the partitioning of the rulebase. At the preprocessing stage, the classification space is composed of 40 bits. Here, the 40 bits are extracted from an 8-bit protocol field, 16-bit source port and 16-bit destination port. That is, only the protocol number and the port number are considered as the hash key for partitioning the rulebase. This is because the protocol number and the port number can naturally classify the rules based on the Internet services which are controlled by the rules. For example, the HTTP service corresponds to the 6th protocol and 80th server port.

If the 8-bit hash key is selected, a hash table having 28 (=256) entries can be made. Here, the respective entries mean the sub-rulebases. Meanwhile, in order to reduce the size of the hash table, one subset is selected from the classification space as a hash key. In this case, it is preferable to select the hash key so that the size of the hash table does not become too large. For example, in the case of using the hash key of 17 bits, a hash table having 128 K entries is produced. Meanwhile, a memory space and the depth of the partitioned layer depending on the size of the hash key are in a trade-off relationship.

In the case of using the hash key of 17 bits, initial 6 bits are extracted from the protocol field using a key selection algorithm that maximizes the entropy. Since only two protocols, i.e., TCP and UDP, are needed in specifying the port number, additional 11 bits for the protocols are selected from the port number.

The port number uses one bit to select either of the departure and the destination, and it is preferable to select a server port having a high density. It is preferable that if the selected port is the server port, additional 10 LSBs (Least Significant Bits) are selected from the port field of the server port, while if the selected port is a client port characterized by an upper boundary and a lower boundary, additional 6 MSBs (Most Significant Bits) are selected from the port field of the client port.

Typically, the server port having a high density points out a specified port number in the range of 0 to 1023. By contrast, the client port having a low density uses a random port number in the range of 1024 to 65536. Accordingly, lower 10 bits are used for the server port, and upper 6 bits are used for the client port.

Specifically, the hash key is related to [protocol field], [direction bit] and [lower 10 bits of the server port or upper 6 bits of the client port]. The server port has a partitioning efficiency higher than that of the client port, and if the rule can specify the server port that belongs to either of the departure and destination ports, the server port is used irrespective of the direction. If the rule can specify the client port that belongs to the departure and destination ports, the rules that belong to the hash table of the departure and the destination are spread using 6 MSBs.

If two rules are mapped on the same sub-rulebase, the two rules may overlap with each other. However, if the two rules match different sub-rulebases, the two rules never overlap with each other. This means that the two rules are independent. In the case of the sub-rulebase having a size larger than a threshold value, it can be partitioned with a hash key different from the first hash key. Here, the threshold value means the number of rules per sub-rulebase.

This hierarchical partitioning continues until all the sub-rulebases become sufficiently small. However, in order to reduce space and time complexities, the frequency of partitioning of the rulebase should be reduced. For this, the rulebase should equally be partitioned into sub-rulebases as far as possible so that the number of empty rulebases is minimized and the rules belonging to the sub-rulebase are uniformly spread. The efficiency of the rule-base partitioning as described above depends on the hash key selection algorithms.

1.3.2 The Second-Level Partioning

The second level partitioning is applied only to buckets larger than the threshold value after the first level partitioning is completed. Since the hash key at the second level partitioning is derived from the hash key at the first level partitioning, the rulebase is partitioned based on the departure IP address and the destination IP address at the second level partitioning. To limit the size of the hash table, a subset is selected from the classification space as a hash key. The IP address is composed of 64 bits including the departure and destination addresses, and the partitioning of the rulebase is performed through the selection of a proper number of bits among the 64 bits. Preferably, about 16 bits including the departure and the destination are selected to perform the partitioning. In this case, since the bits selected for the partitioning directly affects the final result, the present invention proposes four hash key selection algorithms as follows in order to find the optimum bit pattern.

1) MSB Pattern

The hash key of 16 bits is produced by extracting 8 MSBs from the departure and destination IP addresses. This algorithm uses the concept that most prefix masks select several significant bits from the IP address field. This simple hash key algorithm is used as a reference for comparing the performances of other hash key algorithms. The time complexity of this hash key algorithm is 0(1), and this means that it is independent of the number of rules that belong to the rulebase.

2) Exponential Growing Pattern (EXP)

This algorithm produces a hash key of 12 bits by selecting the bit position corresponding to an exponential function of 2, i.e., b1b2b4b8b16b32, from the departure and destination IP addresses.

That is, the bit position is selected so that the distance between the bits becomes by two times, starting from the MSB. This algorithm is based on the concept that as the bit position of the IP address field are lowered, the number of masked-out bits becomes larger. Preferably, in order to produce a hash key of 16 bits, two bits of b6b11 are added. The time complexity of this key selection algorithm is also 0(1).

3) Mask Distribution Pattern (MASK)

This algorithm uses the concept that a dummy bit cannot provide any information. Accordingly, the respective bit bi in the classification space has information according to a reverse rate of the number of dummy bits.

This hash key searching process is as follows. At respective bit positions bi, bits, which are not the dummy bit, are added in all defined rules that belong to a rulebase, and the added values are accumulated from MSB to LSB. In order to produce a hash key of K bits, one bit is selected whenever the accumulated value at the bit position becomes a multiple of a value obtained by dividing the total accumulated value by K. If the total number of rules that belong to the rulebase is n, the time complexity of this algorithm is 0(kn). K used as an experimental result is 16.

4) Entropy-Maximizing Pattern (Ent)

In this embodiment of the present invention, the concept of entropy is used in order to find a good hash key. The concept of entropy is used in information theory. [Robert B. Ash, "Information Theory", Dover Publications, $1^{st}$ edition, November 1990]

A good hash key should uniformly distribute the rules that belong to the hash table so that the difference between the number of null entries and the object number in the respective sub-rulebase is minimized. As is known, if the possibilities of producing all entries are equal, the entropy becomes maximum. Accordingly, a good hash key that can uniformly partition the rulebase should be searched through an entropy calculation. Hereinafter, a maximum entropy calculation for searching for a proper hash key will be explained.

Using the notion of entropy, a hash key $$K\sigma = K\sigma - 1 \oplus_q, \text{ where } \oplus$$

is the concatenation operator and q is the bit from the classification space that produces the maximum entropy. The algorithm starts by calculating the entropy for the hash key of length 1 and determines the bit position that produces the maximum entropy value. Then, the algorithm repeats this process for the hash key of length 2 and so on until the length of the hash key reaches σ or the entropy does not increase further. Based on this algorithm, a 16-bit hash key is created by selecting an 8-bit hash key from each IP address field. The time complexity this algorithm is $$O\left(n \cdot \left[\frac{s}{2}(2w - s + 1)\right]\right),$$

where w is the length of classification space, s is the length of a hash key, and the n is the total number of rules in a rulebase.

1.4 Adaptation of the Algorithm for Prefix Mask and Range Specification

Up to now, the packet classification and the accurate matching values have been assumed. However, The definition of a rule sometimes includes a prefix mask and fields having a specified range. Hereinafter, how the present embodiment of the present invention can process other field specification will be explained.

1.4.1 Prefix Mask Field

This is generally used to specify the range of an IP address field. Table 2 shows an example of a rulebase having a prefix mask.

TABLE 2

| Rule | Field Description (b0b1b2b3b4b5b6b7) |
|---|---|
| R0 | 0000 0000 |
| R1 | 0110 0000 |
| R2 | 1000 0000 |
| R3 | 1*10 0000 |

A dummy bit is indicated by *. Here, it should be considered that if a rule includes a specified field having a mask, it is required to increase the rule by a multiple of an entry that belongs to the hash table.

Table 3 shows two different hash tables that may be constructed for the rulebase as illustrated in Table 2.

TABLE 3

| Index | Hash Key b0b1 | Hash Key b0b2 |
|---|---|---|
| 00 | R0 | R0 |
| 01 | R1 | R1 |
| 10 | R2, R3 | R2 |
| 11 | R3 | R3 |

If the hash key b0b1 is selected, R3 can be spread into two entries having indexes 10 and 11 because b1 is a dummy term in R3. Hereinafter, this phenomenon is described as a 'rule spreading'. As the rules overlap due to the rule spreading, it may refer to the size of the hash table.

However, if the hash key b0b2 is selected, the rule spreading as shown in Table 3 can be avoided. In order to prevent the rule spreading as much as possible, the modification of the maximum entropy key selection algorithm is required. That is, when calculating the entropy of one bit, the algorithm should disregard the defined rule so as to specify the dummy condition for the selected bit. This is because the dummy bit cannot give any information to the system from the viewpoint of entropy.

1.4.2 Range Field

This is generally used to specify a TCP or UDP port. As explained above, a server port generally indicates specified ports in the range of 0 to 1023. By contrast, a client port indicates optional port number in the range of 1024 to 65536.

Here, the basic concept is to convert the range specification into a prefix mask specification.

The range of prefix change for dividing a certain range into a group of prefix masks can be used. For example, [1024, 65535] in the range of 16 bits may be grouped into 6 prefix masks such as 000001*, 00001*, 0001*, 001*, 01* and 1*. However, this method undesirably causes an excessive rule spreading in the algorithm.

In this embodiment of the present invention, a precision-directed grouping is proposed. It is preferable to accurately group a rule having a specified range by multiple values of the rule. For example, the rule having the range of [71, 74] can be divided into 4 rules having accurate values in the range of 71 to 74. However, a rule having a wide range such as [49152, 65535] can be divided into 16,384 rules. Fortunately, the TCP/UDP port having one range is generally preponderant. For example, even if the total number of prepared ports is very large such as [0, 49151], 80% of port numbers used for most rules is less than 3,999.

This means that different numbers of rules, which depend on the density range, can be grouped. Preferably, in a specified port range of 16 bits, 10 LSBs are used as the hash key in a high-density area of [0, 1023] as a single entry is produced with respect to ports less than 1024. By contrast, 6 MSBs are used as the hash key for a low-density area of [1024, 65535] as 63 entries each of which has 1024 ports are produced.

2. Experimentation and Results

In this section, the performance of the proposed algorithms for 5-dimensional classification is demonstrated. Since it is difficult to obtain large real-life classification rulebases, we synthesized large rulebase from real-life packet traces. The packet traces were collected from PUBNET for five to eight hours during three days. One-hour trace is nearly 70 million packets. The first trace is used to synthesize the rulebase and others are used as data for packet classification. To create a synthetic rulebase that resembles real-life rulebases, we carefully synthesized a rulebase that resembles real-life characteristics observed from real-life firewall applications. All of our experimentation was performed in 1.7 GHz Pentium IV system with 512 MB of memory running Linux.

2.1 Rulebase Partitioning 2.1.1 First Level Partitioning

Figure 2:
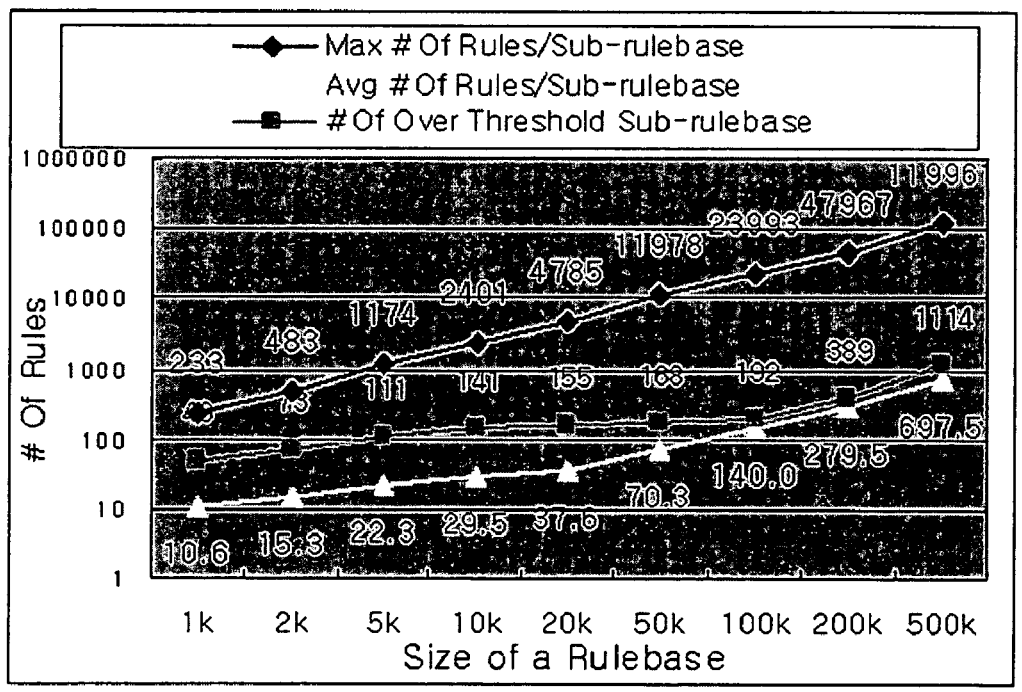
FIG. 2 is a graph illustrating the maximum size and an average size of a sub-rulebase when applying a first hashing step.

FIG. 2 shows results of the first level partitioning. In FIG. 2, the average size and the maximum size of the sub-rulebases after the partitioning are shown. After the partitioning, the average size of the rulebase is actually reduced. The reduction rates of the rulebases in the rulebases having rules, the numbers of which are 10000 (10 K), 100000 (100 K) and 500000 (500 K), are 0.0028, 0.0014 and 0.0014, respectively. However, as can be seen from the maximum size of the rulebase in the drawing, the rules are not uniformly spread in the partitioned rulebase.

The largest sub-rulebase in all the rulebases used in the experiment has rules the number of which corresponds to about 24% of the rules of the original rulebase in all the rulebases tested. As might be expected, these rules are related to the HTTP service corresponding to the protocol 6 and the port number 80. In the rulebase having rulebases the numbers of which are 10000 (10 K), 100000 (100 K) and 500000 (500 K), the numbers of sub-rulebases that exceed the threshold value (which corresponds to 16 rules per sub-rulebase) are 141, 192 and 1114, respectively. With respect to these sub-rulebases, a second level partitioning is performed.

2.1.2 Second Level Partitioning

Figure 3:
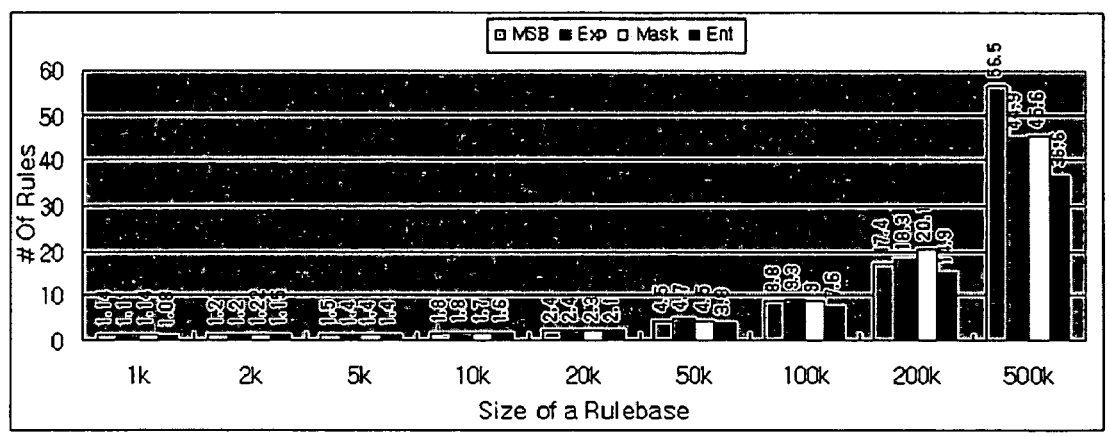
FIG. 3 is a graph illustrating an average number of rules according to the size of the sub-rulebase after the second hashing step is applied thereto using diverse hash key selection algorithms.
Figure 4:
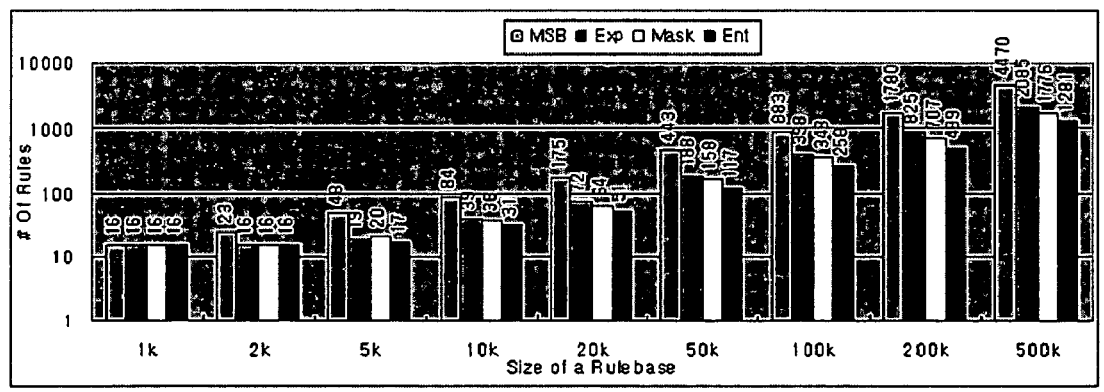
FIG. 4 is a graph illustrating the maximum number of rules according to the size of the sub-rulebase after the second hashing step is applied thereto using diverse hash key selection algorithms.

FIGS. 3 and 4 show the results obtained by performing the second level partitioning using diverse hash key selection algorithms. FIG. 3 shows an average number of rules per sub-rulebase, and FIG. 4 shows the size of the largest rulebase. In the case of using the maximum entropy hash key algorithm, the second level partitioning reduces the rulebases having 10000 (10 K), 100000 (100 K) and 500000 (500 K) rules by the rates of 0.054, 0.054 and 0.052, respectively, in comparison to the first level partitioning.

After the first level partitioning and the second level partitioning are all completed, the rulebases having 10000 (10 K), 100000 (100 K) and 500000 (500 K) rules are partitioned into sub-rulebases having 1.6, 7.6 and 36.6 rules, respectively, on the average. This means that the rulebases are reduced by the rates of 0.00016, 0.000076 and 0.000073.

The second level partitioning is effective in reducing an enormous sub-rulebase that includes 24% of the original rulebase after the first level partitioning. After the second level partitioning is performed, the sizes of the largest rulebases can be reduced from the rulebases having 10000 (10 K), 100000 (100 K) and 500000 (500 K) rules to rulebases having 31, 258 and 1281 rules, respectively, using the maximum entropy hashing algorithm.

These rulebases correspond to 0.31%, 0.26% and 0.26% of the original rulebases. This means that in the case of the rulebase having 100 K rules, 256 rules should be confirmed with respect to one packet in the worst case. The second level partitioning is more efficient than the first level partitioning in reducing the size of the largest rulebase. The first level partitioning partitions the original rulebases according to the Internet service that controls the rules.

Accordingly, the largest sub-rulebases that control the HTTP service are grouped into a single sub-rulebase. By contrast, the second level partitioning can reduce the largest sub-rulebases by considering the distribution of the rules in the classification space using the maximum entropy hash key algorithm.

Referring to FIGS. 3 and 4, the efficiencies of the different hash key algorithms in the second level partitioning can be compared. As was expected, an optimum result of partitioning was derived through selection of the maximum entropy key. Particularly, this method can reduce the size of the largest sub-rulebase in comparison to other key selection algorithm. The maximum entropy selection algorithm is efficient as much as the factors of 2.38, 3.42 and 3.49 with respect to the rulebases having 10 K, 100 K and 500 K rules in comparison to the MSB pattern key algorithm. Comparative results of the average sizes of the sub-rulebases are illustrated with respect to all the key selection algorithms. However, the maximum entropy algorithm is most efficient with respect to rulebases having 100 K or more rules.

It is difficult to judge the expansion from the results of rulebase partitioning as shown in FIGS. 3 and 4 since the size of the rulebase is not linearly increased on a horizontal axis. However, as a result of experiment, it is proved that as the size of the rulebase is increased, the maximum size and average size of the sub-rulebase are linearly increased. This results from the two level partitioning. If needed, much more level partitioning may be performed to further reduce the size of the sub-rulebase. As described above, the amount of memory required for the algorithm according to an embodiment of the present invention was investigated considering the total number of rules, the total number of buckets and the increase rate of the total number of buckets that exceed the threshold value, and the algorithm appears a good scalability with respect to the total number of rules, the total number of buckets and the increase rate of the total number of buckets that exceed the threshold value.

2.2 Classification Performance

To demonstrate the classification performance of our algorithm, real-life packet traces which collected from PUBNET are used. The size of packet trace is 202 million packets, which is big enough to obtain the confidence of our experiment. After the first and second-level partitioning, the worst-case search algorithm is assumed, for example, a simple linear search, to find the matching rule in the final sub-rulebase so that the pure effectiveness of the proposed partitioning algorithm can be showed.

Figure 6:
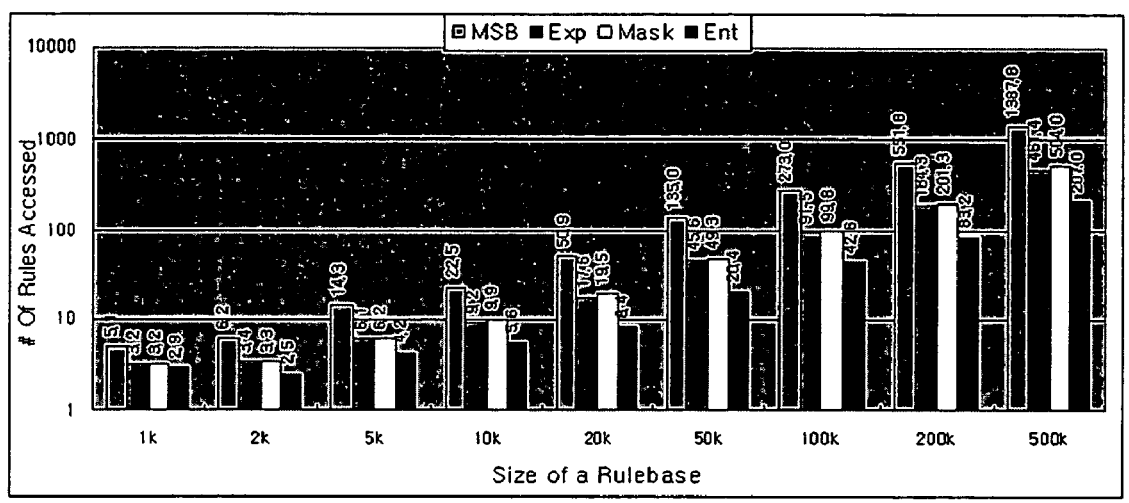
FIG. 6 is a graph showing the classification performance from the viewpoint of the average number of rules referred to for searching the matching rule.

FIG. 6 is a graph showing the classification performance from the viewpoint of the average number of rules referred to for searching the matching rule. Referring to FIG. 6, the result of packet classification using the maximum entropy key selection algorithm shows that the rulebase having 10000 (10 K), 100000 (100 K) and 500000 (500 K) rules has been reduced to the rulebase having 5.6, 42.64 and 207.02 rules.

This result is very encouraging in consideration of the fact that the most superior packet classification method in the prior art requires at lest 13th times referring of a memory for the packet classification in the rulebase having 5000 (=5 K) rules. According to an embodiment of the present invention, even in the case that a linear search, which is the worst for the final sub-rulebase, is performed, only two times referring of a memory is required to search the hash table, and only 5 to 6 rules should be referred to.

According to the above-described embodiment of the present invention, the size of the rulebase can actually be reduced through two-level partitioning. For example, in the rulebase having 100 K rules, the number of rules is 7.6 on the average, and 258 in the worst case. In the rulebase having 100000 (=100 K) rules, the packet classifier checks only 258 rules with respect to the input packet in the worst case.

According to the experimental data in the actual packet trace, the packet classifier checks only 4.2, 5.6, 8.4, 20.4, 42.6, 83.2 and 207 rules, on the average, in the rulebase having 5000 (5 K), 10000 (10 K), 20000 (20 K), 50000 (50 K), 100000 (100 K), 200000 (200 K) and 500000 (500 K) rules, respectively.

Even if the search is performed in the sub-rulebase in the worst case, the above-described embodiment of the present invention surpasses the RFC method, which is one of the optimum algorithms, in the case that the size of the rulebase is relatively small. Here, the RFC method requires 13th times referring of a memory with respect to the rulebase having a size of 500 (=5 K) rules. Also, as the size of the rulebase is increased, the above-described embodiment of the present invention has a peculiar scalability in space and time.

Although an embodiment of the present invention have been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A packet classification method for searching for a rule having a highest priority and matching among a plurality of rules included in a specified rulebase with respect to a packet input from an external network and processing the packet according to the searched rule, the method comprising:

preprocessing by partitioning the rulebase into a plurality of independent sub-rulebases based on a specified condition and producing a hash table on the basis of the sub-rulebases; and classifying the packet by searching the hash table using a hash key extracted from a packet header of the inputted packet and mapping the packet on the sub-rulebase corresponding to the packet, wherein the preprocessing includes a first partitioning of the rulebase into the plurality of sub-rulebases based on a specified protocol and a specified port number and producing the hash table on the basis of the sub-rulebases, wherein the preprocessing includes a second partitioning re-partitioning a specified sub-rulebase among the plurality of sub-rulebases using the hash key extracted by a specified method from departure and destination IP addresses, and producing the hash table on the basis of the sub-rulebases when the number of rules on the specified sub-rulebases exceeds a specified threshold value, wherein the specified method is an MSB pattern, an exponential growing pattern, a mask distribution pattern or an entropy-maximizing pattern, and wherein the mask distribution pattern method calculates accumulated values at respective bit positions bi by adding the number of bits which are not a dummy bit in all defined rules belonging to the rulebase, calculates the total accumulated value by adding the accumulated values from the most significant bit to the least significant bit, and then selects the specified bit position whenever the accumulated value at the specified bit position becomes a multiple of a value obtained by dividing the total accumulated value by K which is a bit value of the hash key to be generated.

2. The packet classification method as claimed in claim 1, wherein a specified application is determined according to the protocol and the port number.

3. The packet classification method as claimed in claim 1, wherein the MSB pattern method selects a specified number of bits from most significant bits of the destination IP address and the departure IP address.

4. The packet classification method as claimed in claim 1, wherein the exponential growing pattern method selects a bit position corresponding to an exponential function of 2 from the destination IP address and the departure IP address.

5. The packet classification method as claimed in claim 1, wherein the entropy-maximizing pattern method selects a specified number of bits that maximize entropy from the destination IP address and the departure IP address.

6. The packet classification method as claimed in claim 1, wherein rules that control hypertext transport protocol (HTTP), file transfer protocol (FTP), or simple mail transfer protocol traffic are partitioned into the sub-rulebases.

7. A method of reducing a search time for packet classification of an input packet, comprising:

hierarchally partitioning a rulebase into sub-rulebases by hashing bit fields selected from a classification field;

extracting a hash key from a header of the input packet; and searching a hash table using the hash key to match the input packet to a corresponding sub-rulebase, wherein the hierarchally partitioning includes a first partitioning of the rulebase into the plurality of sub-rulebases based on a specified protocol and a specified port number and producing the hash table on the basis of the sub-rulebases, wherein the hierarchally partitioning includes a second partitioning re-partitioning a specified sub-rulebase among the plurality of sub-rulebases using the hash key extracted by a specified method from departure and destination IP addresses, and producing the hash table on the basis of the sub-rulebases when the number of rules in the specified sub-rulebase exceeds a specified threshold value, wherein the specified method is an MSB pattern, an exponential growing pattern, a mask distribution pattern or an entropy-maximizing pattern, and wherein the mask distribution pattern method calculates accumulated values at respective bit positions bi by adding the number of bits which are not a dummy bit in all defined rules belonging to the rulebase, calculates the total accumulated value by adding the accumulated values from the most significant bit to the least significant bit, and then selects the specified bit position whenever the accumulated value at the specified bit position becomes a multiple of a value obtained by dividing the total accumulated value by K which is a bit value of the hash key to be generated.

8. The method as claimed in claim 7, wherein a degree of partitioning of the rulebase depends on a density of the sub-rulebases in a classification space.

9. The method as claimed in claim 7, wherein the partitioning continues until the sub-rulebases are smaller than a specified size.

10. The method as claimed in claim 7, wherein the partitioning continues until rules of the rulebase are uniformly spread throughout the sub-rulebases.

11. A packet classification method of searching for a rule having a highest priority in a rulebase with respect to an input packet and, comprising:

partitioning the rulebase into a plurality of sub-rulebases based on a specified condition and producing a hash table on the basis of the sub-rulebases;

extracting a hash key from a packet header of packet; and classifying the packet by searching the hash table using the hash key; and mapping the packet on the sub-rulebase corresponding to the packet, wherein the partitioning includes a first partitioning of the rulebase into the plurality of sub-rulebases based on a specified protocol and a specified port number and producing the hash table on the basis of the sub-rulebases, wherein the partitioning includes a second partitioning re-partitioning a specified sub-rulebase among the plurality of sub-rulebases using the hash key extracted by a specified method from departure and destination IP addresses, and producing the hash table on the basis of the sub-rulebases when the number of rules in the specified sub-rulebase exceeds a specified threshold value, wherein the specified method is an MSB pattern, an exponential growing pattern, a mask distribution pattern or an entropy-maximizing pattern, and wherein the mask distribution pattern method calculates accumulated values at respective bit positions bi by adding the number of bits which are not a dummy bit in all defined rules belonging to the rulebase, calculates the total accumulated value by adding the accumulated values from the most significant bit to the least significant bit, and then selects the specified bit position whenever the accumulated value at the specified bit position becomes a multiple of a value obtained by dividing the total accumulated value by K which is a bit value of the hash key to be generated.

12. The packet classification method as claimed in claim 11, wherein the sub-rulebases are independent.

13. The packet classification method as claimed in claim 11, further comprising processing the packet according to the corresponding rule.

* * * * *

UNITED STATES PATENT AND TRADEMARK OFFICE
CERTIFICATE OF CORRECTION

PATENT NO.          : 7,480,302 B2                                        Page 1 of 1
APPLICATION NO.  : 11/118326
DATED                 : January 20, 2009
INVENTOR(S)        : Lynn Choi It is certified that error appears in the above-identified patent and that said Letters Patent is hereby corrected as shown below:

Column 14, Line 15, change "on" to --in--.

Column 14, Line 16, change "sub-rulebases" to --sub-rulebase--.

Signed and Sealed this

Thirty-first Day of March, 2009

JOHN DOLL
*Acting Director of the United States Patent and Trademark Office*